No. 860,046. PATENTED JULY 16, 1907.
C. R. MESTON.
MACHINE OPERATING MECHANISM.
APPLICATION FILED JAN. 9, 1907.
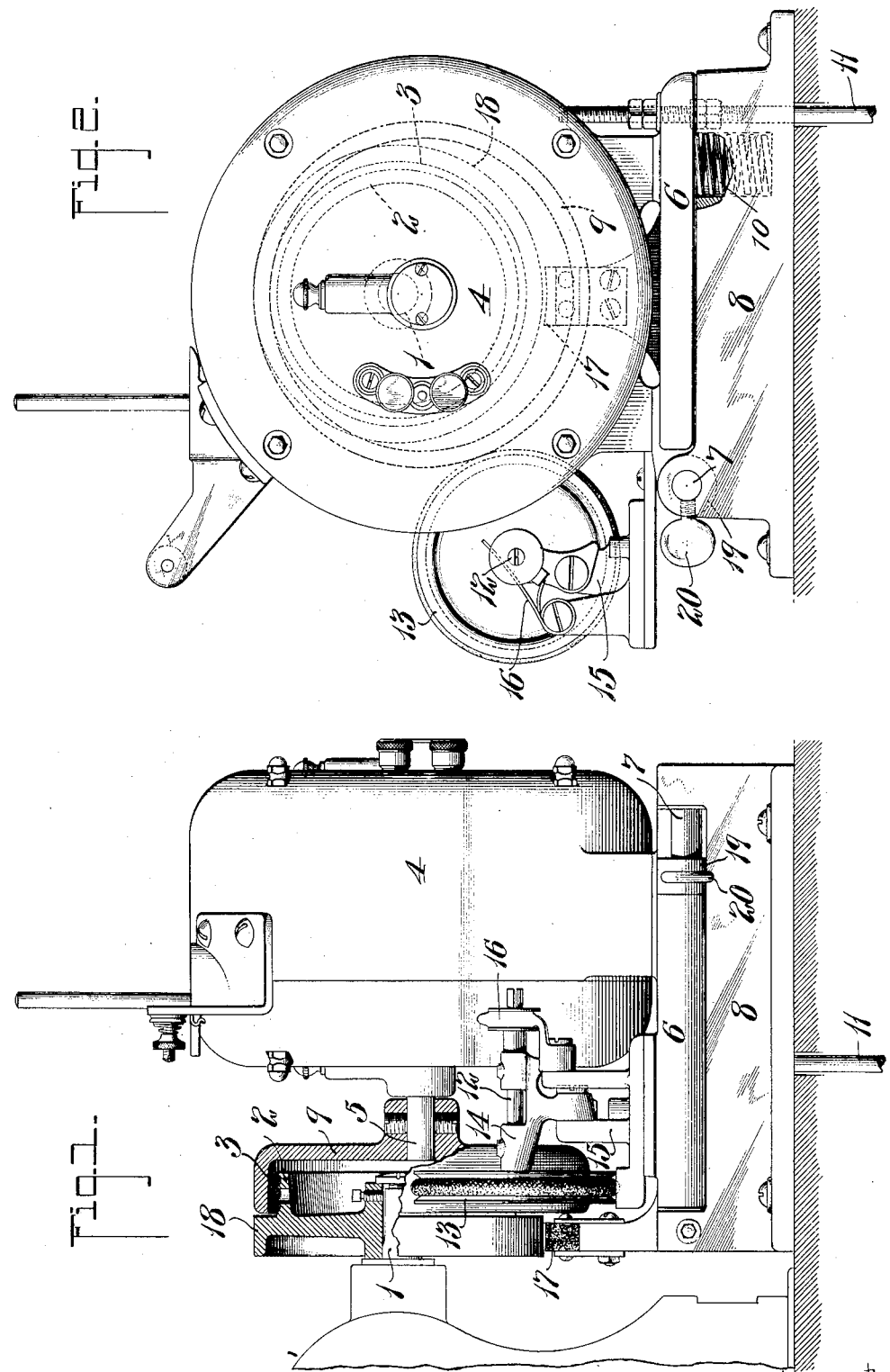
Witnesses:
George R. Ladson.
Wells L. Church
Inventor,
Charles R. Meston.
By Bakewell & Cornwall Attys.

UNITED STATES PATENT OFFICE.

CHARLES R. MESTON, OF ST. LOUIS, MISSOURI, ASSIGNOR TO THE EMERSON ELECTRIC MANUFACTURING COMPANY, OF ST. LOUIS, MISSOURI, A CORPORATION OF MISSOURI.

MACHINE-OPERATING MECHANISM.

No. 860,046.	Specification of Letters Patent.	Patented July 16, 1907.

Application filed January 9, 1907. Serial No. 351,526.

*To all whom it may concern:*

Be it known that I, CHARLES R. MESTON, a citizen of the United States, residing at St. Louis, Missouri, have invented a certain new and useful Improvement in Machine-Operating Mechanisms, of which the following is a full, clear, and exact description, such as will enable others skilled in the art to which it appertains to make and use the same, reference being had to the accompanying drawings, forming part of this specification, in which—

Figure 1 is a front elevation partly in section illustrating my invention; and Fig. 2 is an end view of the parts shown in Fig. 1.

This invention relates to electric motors and particularly to motors of that type which are generally employed for driving single machines, such, for example, as sewing machines.

One object of my invention is to provide means whereby a machine may be driven at high speed by a motor which runs at a lower speed.

Another object of my invention is to provide improved means for permitting the speed of the driven machine to be varied without changing the speed of the driving motor. And still another object of my invention is to provide a support carrying a motor and being so constructed that it can be moved to disengage the coöperating gear members on the driven machine and on the motor.

Briefly stated, my invention consists of a motor provided with a gear member that is adapted to surround a gear member of smaller diameter on the shaft of a machine to be driven, a movable support for carrying said motor, and means for changing the position of said support to vary the frictional engagement between the flange of the motor gear and the periphery of the machine gear, thereby changing the speed at which the machine is driven. The motor is designed to drive a machine provided with a horizontal shaft arranged approximately in alinement with the armature shaft of the motor and the support which carries the motor is so constructed that it can be moved longitudinally toward and away from the machine to carry the flanged gear member on the motor into and out of position for engagement with the gear member on the machine, thereby enabling the head of the machine which carries the main shaft to be adjusted or moved, such, for example, as in a sewing machine in which it is often necessary to tilt the head backwardly. A bobbin-winder is mounted on the motor support and is provided with a friction-surfaced wheel that coöperates with the outer face of the flange on the motor gear, the motor support being also provided with a brake member which coöperates with a brake member on the shaft of the driven machine to arrest the movement of said shaft when the motor gear is thrown out of engagement with the gear member of the machine.

While I have herein illustrated and described my improvement as being applied to a sewing machine, it will, of course, be understood that it could be employed in connection with various types of machines, and furthermore, while I have described the motor gear as consisting of a flanged member of greater diameter than the gear member of the driven machine, it will, of course, be obvious that I could transpose these members when it is desired to use a high speed motor for driving a low speed machine.

The particular construction of the motor is immaterial so far as my invention is concerned.

Referring to the drawings which represent the preferred form of my invention, 1 designates the shaft of the driven machine to which a circular gear member 2 is secured, said member being provided with a friction surface 3. The motor 4 is arranged with its armature shaft 5 approximately in longitudinal alinement with the shaft of the driven machine and said motor is mounted on a support 6 that is pivotally mounted on a rod 7 carried by a stationary base 8. A flanged gear member 9 is secured to the armature shaft of the motor and when the motor is in operative position, as shown in Fig. 1, this flanged gear member surrounds the gear member 2 on the shaft of the driven machine. The rear end of the support 6 is held normally elevated by a spiral spring 10 interposed between said support and the base 8 so that the inner face of the flange of the motor gear member 9 will be held out of engagement with the periphery of the gear member 2 of the machine.

When it is desired to have the machine operate, the motor is started and the rear end of the support 6 is then depressed slightly, preferably by means of a foot treadle attached to a rod 11 which is adjustably connected to the rear end of the support, the depression of the support causing the flange of the motor gear member to lightly engage the periphery of the machine gear member and thus drive the machine slowly. As pressure on the foot treadle is increased and better contact is secured between the gear members, the speed of the machine increases gradually to maximum.

As the diameter of the flanged motor gear member 9 is greater than that of the machine gear member it will be obvious that when the support is fully depressed the machine will be driven at a higher speed than that at which the motor runs, thereby enabling me to use a low speed motor for operating a high speed machine. If it is desired to use the motor for driving a machine which is designed to run at a lower speed than the motor, I transpose the gear members.

A bobbin-winder is mounted on the support 6 and consists of a shaft 12 provided at one end with a friction-surfaced wheel 13 that is adapted to coöperate with the outer face of the motor gear member 9, said shaft being mounted in an arm 14 that is pivotally connected to a standard 15 on the support, the arm being retained in position to hold the wheel 13 in or out of engagement with the gear member 9 by means of a spring 16.

A brake member, preferably consisting of a friction pad 17 is secured to the support 6 and coöperates with a disk or fly-wheel 18 on the machine shaft 1 when the motor is in operative position and when the rear end of the support is elevated, thereby causing the machine to come to rest as soon as the operator removes his foot from the treadle.

To enable the motor to be used for driving a sewing machine of that type in which it is sometimes necessary to tilt back the head, I have constructed the support 6 so that it can be moved away from the machine to be operated so that the flanged gear member on the motor will be moved out of position for coöperating with the gear member of the machine. This I accomplish by mounting the support 6 so that it can be moved longitudinally of the rod 7 on which it is pivoted, and for retaining said support in its normal position on the rod, as shown in Fig. 1, I use a collar 19 that is connected to the rod by a thumb screw 20.

Having thus described my invention, what I claim as new and desire to secure by Letters Patent is:

1. In combination, a driven shaft, a gear member on said shaft, a motor having its shaft arranged approximately in longitudinal alinement with the driven shaft, a coöperating gear member on said motor shaft, and a support carrying said motor and being adapted to be moved in a line parallel to the axis of the driven shaft to carry said gear members into and out of vertical alinement with each other; substantially as described.

2. In combination, a driven shaft, a gear member and a brake wheel on said shaft, a motor, a coöperating gear member actuated by said motor, a movable support on which said motor is mounted, a brake member carried by said support, and means for moving said support to throw the coöperating gear members and the coöperating brake members into and out of engagement with each other; substantially as described.

3. In combination, a driven shaft, a gear member secured thereto, a motor, a coöperating gear member actuated by said motor and surrounding the gear member on the driven shaft, a support on which said motor is mounted, a base, a rod connected to said base and having said support pivotally mounted thereon, and means for actuating said support to vary the degree of contact between said coöperating gear members; substantially as described.

4. In combination, a shaft, a gear member connected to said shaft, a motor, a coöperating gear member actuated by said motor, a support on which said motor is mounted, a base, a rod carried by said base and having said support pivotally mounted thereon, adjustable means for preventing the support from moving longitudinally of said rod, and a treadle rod adjustably connected to said support; substantially as described.

In testimony whereof I hereunto affix my signature in the presence of two witnesses, this fifth day of January, 1907.

CHARLES R. MESTON.

Witnesses:
JOHN A. KRAENCHI,
GEORGE BAKEWELL.